United States Patent [19]

Poirot

[11] 4,452,005

[45] Jun. 5, 1984

[54] SYSTEM FOR ENTICING, ENCLOSING AND HOLDING FISH

[76] Inventor: Eugene M. Poirot, Golden City, Mo. 64748

[21] Appl. No.: 372,973

[22] Filed: Apr. 29, 1982

[51] Int. Cl.³ ............................................. A01K 69/00
[52] U.S. Cl. ....................................... 43/100; 43/103; 43/4.5; 43/7; 43/14
[58] Field of Search ................................. 43/100–105, 43/4.5, 7, 14

[56] References Cited

U.S. PATENT DOCUMENTS

| | | | |
|---|---|---|---|
| 1,463,857 | 8/1923 | Wagner | 43/102 |
| 2,663,117 | 12/1953 | Ederer | 43/100 |
| 3,631,841 | 1/1972 | Poirot | 119/81 |
| 3,754,348 | 8/1973 | Ramsey | 43/103 |
| 3,786,593 | 1/1974 | Gerbrandt | 43/100 |
| 3,821,861 | 7/1974 | Jalbert | 43/100 |
| 3,830,004 | 8/1974 | Poirot | 43/8 |
| 4,198,925 | 4/1980 | Lindbergh | 43/100 |

*Primary Examiner*—Nicholas P. Godici
*Assistant Examiner*—Kurt Rowan
*Attorney, Agent, or Firm*—Rogers, Eilers & Howell

[57] ABSTRACT

A feed-holding member entices fish into a fish-trapping device which has an "exit only" closure for an outlet opening thereof. A "live net" is connected to that fish-trapping device adjacent that outlet opening, and, when the fish have satisfied their appetites, they will attempt to escape from the fish-trapping device. In doing so, the fish will open the "exit only" closure and pass through the outlet opening into the "live net"—which will hold the fish until they can be removed from that "live net".

16 Claims, 9 Drawing Figures

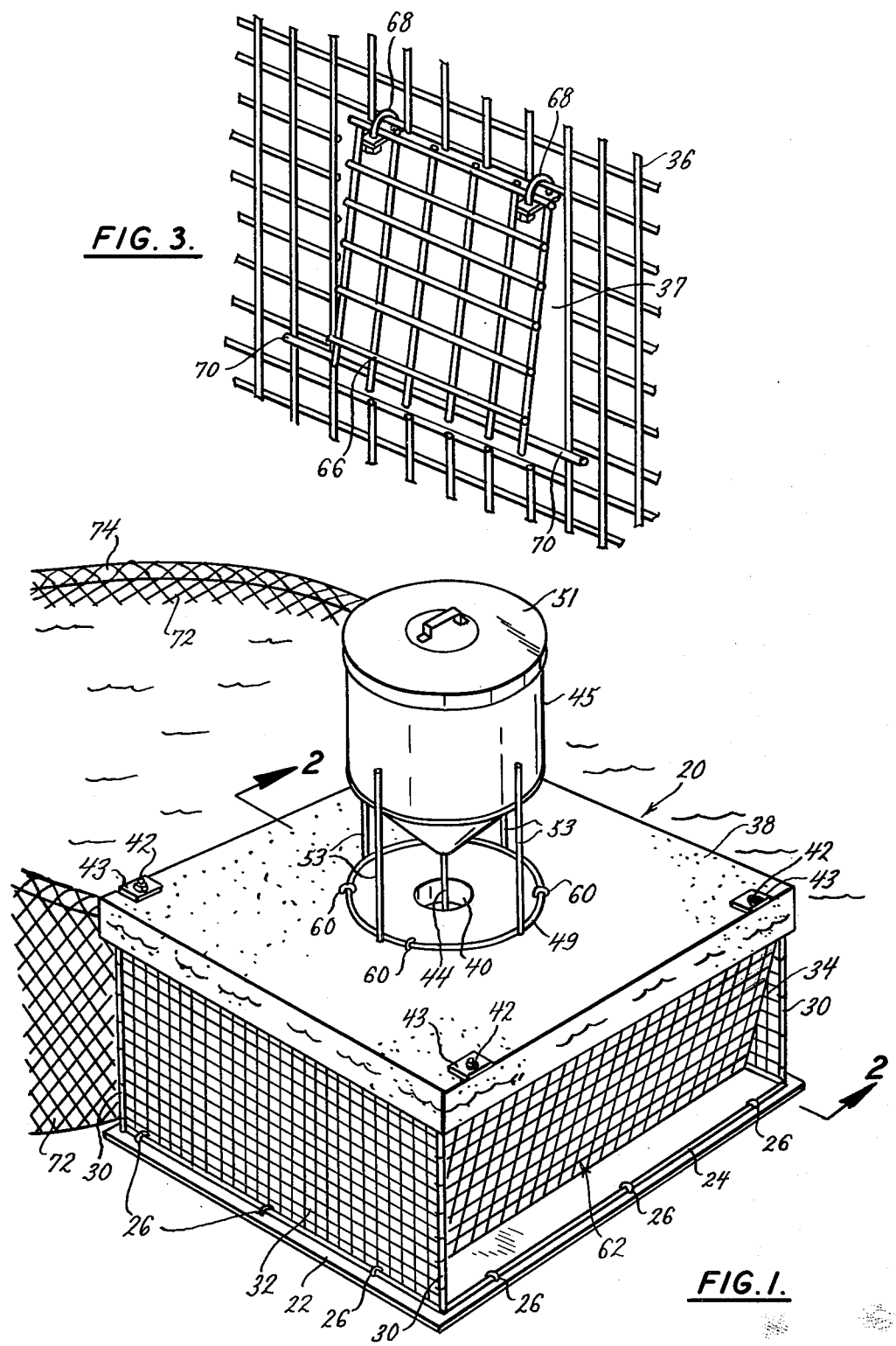

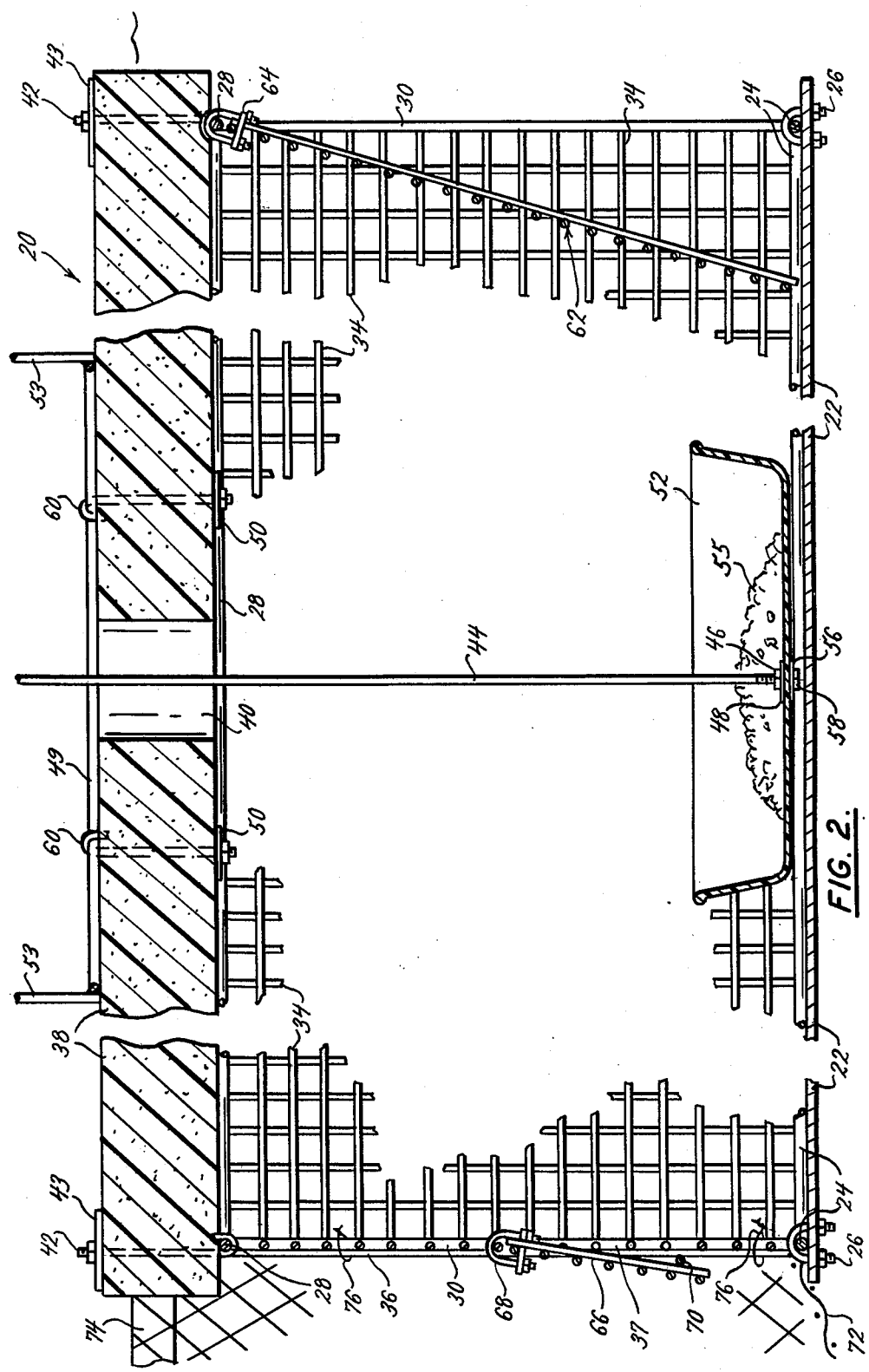

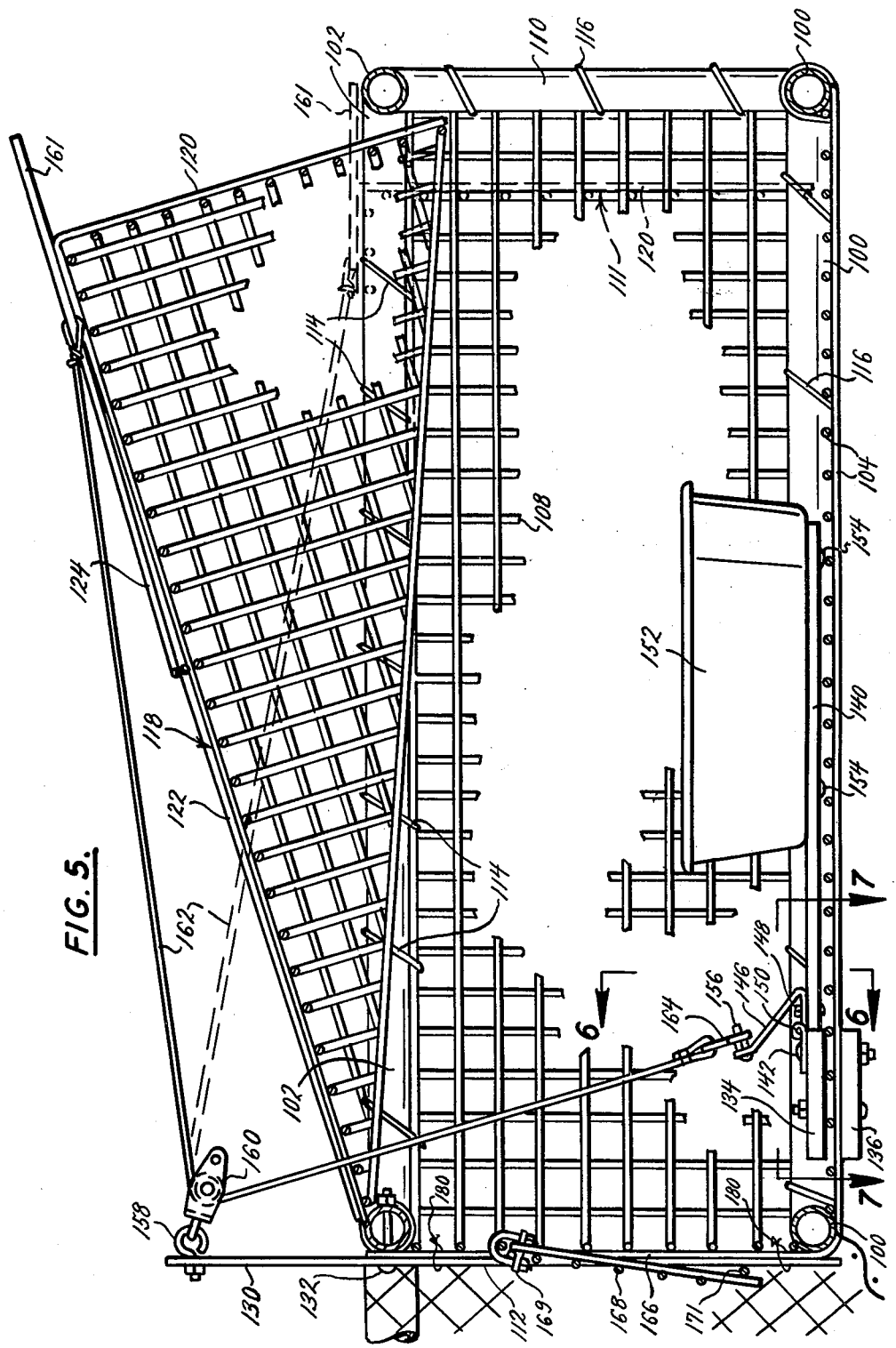

SYSTEM FOR ENTICING, ENCLOSING AND HOLDING FISH

BACKGROUND OF THE INVENTION

1. Field of the Invention

Many fish-trapping devices can trap only limited numbers of fish before they must be emptied. In many instances, the numbers of fish which are trapped by such fish-trapping devices are so limited that the collecting of the fish can involve undesirably-large ratios of collecting time to weight of fish.

2. Prior Art

In my U.S. Pat. No. 3,815,279 for FISHING NET which was granted on June 11, 1974, a very practical and useful fishing net and signaling device were disclosed. Although that fishing net and signaling device are very practical and usable, they require the fisherman to raise that net whenever the signal is developed—irrespective of the numbers of fish within that net.

In my U.S. Pat. No. 3,830,004 for FISHING NET which was granted on Aug. 20, 1974, a fishing net was disclosed which had an inflatable tube that normally had little or no air in it. After substantial numbers of fish had entered that net and had eaten substantial amounts of feed from a feed pan, that feed pan tilted to close a switch—thereby causing a solenoid valve to open to permit compressed gas to inflate the tube. The consequent raising of the upper edge of the net to the surface of the body of water trapped the fish. Although that fishing net is very practical and useful, the fish must be collected each time the tube is inflated, even though large numbers of fish could have left that net prior to the time the fish ate enough feed to permit the feed pan to tilt.

SUMMARY OF THE INVENTION

The present invention provides an enticing, trapping and holding system for fish which has a feed-holding member within a fish-trapping device to entice fish into that fish-trapping device. That device has an "exit only" closure for an outlet opening thereof; and a "live net" is connected to that fish-trapping device adjacent that outlet opening. When the fish have satisfied their appetites, they will attempt to escape from the fish-trapping device. In doing so, the fish will open the "exit only" closure and pass through the outlet opening into the "live net"—which will hold the fish until they can be removed from that "live net". It is, therefore, an object of the present invention to provide an enticing, trapping and holding system for fish which entices fish into a fish-trapping device and then causes those fish to pass into a "live net" where they will be held until they are collected.

In one embodiment of the present invention, each fish is automatically trapped within the fish-trapping device as soon as it passes through an "enter only" closure adjacent an inlet opening of that device. After that fish has satisfied its appetite, it will move past an "exit only" closure for an outlet opening and enter the "live net" adjacent that outlet opening. By maintaining a supply of feed within the feed-holding member of that embodiment, it is possible to cause large numbers of fish to be successively enticed, trapped and held. It is, therefore, an object of the present invention to provide an enticing, trapping and holding system for fish which automatically traps each fish that enters a fish-trapping device and then automatically permits that fish to pass to a "live net".

In another embodiment of the present invention, the fish-trapping device has a normally-open inlet opening which is automatically blocked when fish within that device eat enough of the feed in the feed-holding member. The fish within the fish-trapping device will respond to the blocking of the normally-open inlet opening to push past the "exit only" closure for the outlet opening and enter the "live net". That closure will keep the fish from returning to, and escaping from, the fish-trapping device as that device is opened to (a) have additional feed added to the feed-holding member and (b) be re-set. Consequently, fish can be held in the "live net" while the fish-trapping device is recurrently re-set to trap additional fish. It is, therefore, an object of the present invention to provide an enticing, trapping and holding system for fish which entices fish into a fish-trapping device and which will permit the fish to pass into a "live net" where they will be held as that fish-trapping device is re-set.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a perspective view of a fish-trapping device and of part of a "live net" which are parts of one enticing, trapping and holding system for fish, FIG. 2 is a broken sectional view, on a larger scale, which is taken along the plane indicated by the line 2—2 in FIG. 1, FIG. 3 is a perspective view, on a still larger scale, of an outlet opening in the rear of the fish-trapping device of FIGS. 1 and 2 and of an "exit only" closure adjacent that opening, FIG. 5 is a vertical section, on a larger scale, which is taken along the plane indicated by the line 5—5 in FIG. 4.

DETAILED DESCRIPTION OF PREFERRED EMBODIMENTS

Figure 4:
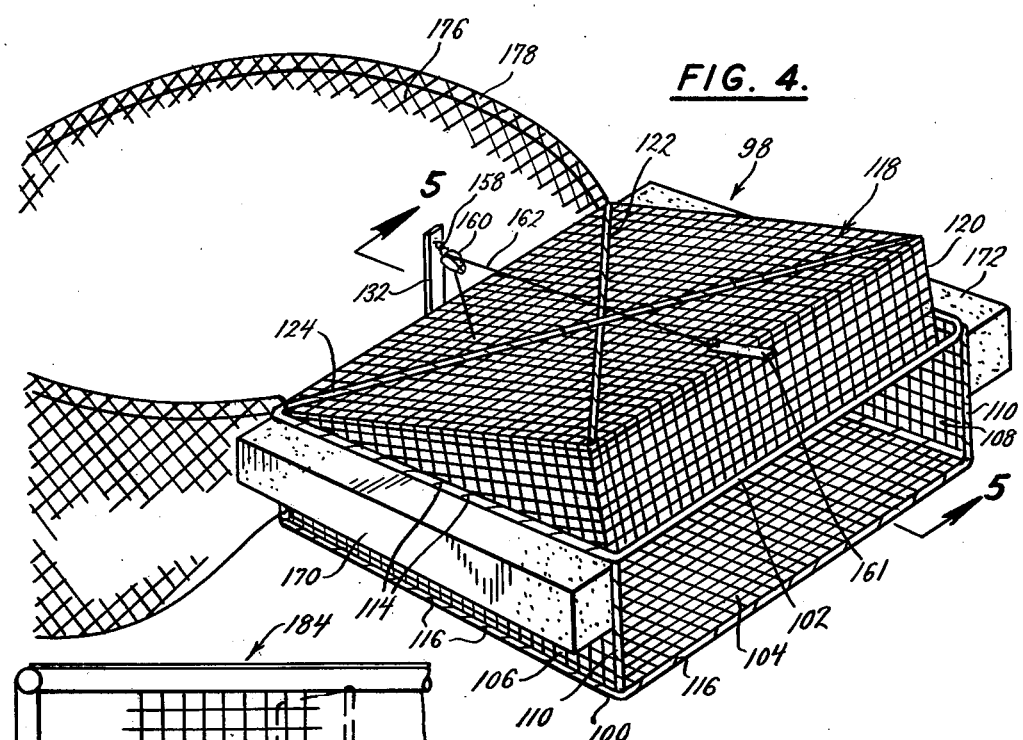
FIG. 4 is a perspective view of a fish-trapping device and of part of a "live net" which are parts of a second enticing, trapping and holding system for fish.

Referring particularly to FIGS. 1-3, the numeral 20 generally denotes one preferred embodiment of fish-trapping device which is part of an enticing, trapping and holding system for fish. The numeral 22 denotes the bottom of that fish-trapping device; and a rectangular frame 24 is secured to that bottom by connectors 26. Those connectors are shown as U-bolts, but any desired kind or form of connector could be used. The numeral 28 denotes a similar rectangular frame which is spaced above the rectangular frame 26 by four spacers 30. The rectangular frames 24 and 28 and the spacers 30 could be made from plastic or metal rods or tubes.

The numeral 32 denotes one side of the fish-trapping device 20, the numeral 34 denotes the opposite side of that device, and the numeral 36 denotes the rear of that device. Those sides and that rear are perforate in nature; and they could be made by a weaving process, by a stamping process, by a brazing or welding process, by a plastic molding process, or by any other suitable process. In the particular embodiment shown by FIGS. 1–3, the sides 32 and 34 and the rear 36 are formed by small diameter, vertically-directed rods to which small-diameter, horizontally-directed rods are welded; but a thin, molded plastic, screen-like sheet is preferred for the sides 32 and 34, where sturdy frames 24 and 28 and spacers 30 are used. The numeral 37 denotes an outlet opening which is provided in the rear 36, which is generally-rectangular in form, and which is large enough to permit large fish to pass through it. In the said one preferred embodiment, that outlet opening is large enough to permit ten pound catfish to pass through it.

The numeral 38 denotes a rectangular block of buoyant material, such as closed-cell foam plastic, which serves as the top of the fish-trapping device 20. That block is slightly longer and slightly wider than the frame 28, its edges project outwardly beyond the edges of that frame, and it is secured to that frame by J-bolts 42. Rectangular washers 43 encircle the shanks of the J-bolts 42 and support nuts which are threaded onto those shanks. The numeral 40 denotes a cylindrical opening through the block 38; and that opening will be large enough to permit feed to fall through it. In one embodiment of the present invention, that hole is five inches in diameter. Fish which are to be trapped within the fish-trapping device 20 will be unable to propel themselves upwardly and through that opening.

The numeral 45 denotes a hopper which has a conical bottom; and that hopper is similar to the hopper which is disclosed in my U.S. Pat. No. 3,631,841 for Automatically Operated Feeding Device which was granted Jan. 4, 1972. The lower end of that conical bottom has an opening therein which normally is closed by a ball-type valve, not shown, that is similar to the ball-type valve in U.S. Pat. No. 3,631,841. The numeral 44 denotes an elongated rod which is secured to that ball-type valve and which extends downwardly through the opening 40 in the block 38 and through an opening in the bottom of a feed pan 52. Nuts 46 and 58 and washers 48 and 56 secure the pan 52 to the lower end of the rod 44, and also hold the bottom of that pan at right angles to the axis of that rod. Whenever a predetermined amount of feed 55 is disposed within the pan 52, the weight of that feed will coact with the weight of that pan and of the rod 44 to hold the ball-type valve against the inner surface of the conical bottom of the hopper 45, and thereby prevent the escape of feed from that hopper. However, whenever fish have eaten away enough of the feed 55, a spring—which preferably is similar to the spring in U.S. Pat. No. 3,631,841—will raise the ball-type valve, the rod 44 and the pan 52 far enough to permit feed to move downwardly between that ball-type valve and the inner surface of the conical bottom of the hopper 45. That feed will fall downwardly through the opening 40 and be received and held by the pan 52. The hopper 45, with its ball-type valve and spring, will thus coact with rod 44 and pan 52 to maintain an amount of feed 55—which varies between a predetermined minimum and a predetermined maximum—in that pan until the supply of feed in that hopper is exhausted. The operation of hopper 45 and its ball-type valve and spring will be essentially the same as the operation of the hopper, ball-type valve and spring of U.S. Pat. No. 3,631,841. A removable cover 51 for the hopper 45 permits easy and quick replenishment of the feed within that hopper.

The numeral 53 denotes legs which are secured to, and which extend downwardly from, the hopper 45. The lower ends of those legs are secured to a ring 49 that is secured to the block 38 by J-bolts 60, as shown particularly by FIG. 2. Washers 50 are interposed between the lower surface of that block and nuts which are threaded onto the shanks of those J-bolts. The buoyancy of the block 38 is great enough to hold all portions of the conical lower portion of the hopper 45 above the surface of any body of water in which the fish-trapping device 20 may be disposed—even when that hopper is filled with feed and the pan 52 also is filled with feed. At such time, the upper surface of the block 38 will project above the surface of that body of water.

The numeral 62 denotes a closure for the front of the fish-trapping device 20. That closure is perforate; and it can be made by weaving, stamping, brazing, welding or any other suitable process. If that closure were to be provided with a frame, it could be made from a thin, molded plastic, screen-like sheet. The sizes of the interstices of that closure preferably are the same as those of the interstices of the sides 32 and 34 and rear 36. The height of that closure is greater than the length of any of the spacers 30; and hence the lower end of that closure engages and rests upon the bottom 22 as gravity tends to move that closure toward a vertical position adjacent the front spacers 30. The upper edge of closure 62 is pivoted to the frame 28 by U-bolts 64; and the undersurface of the block 38 is suitably recessed or cut away to permit free rotation of that closure and its U-bolts relative to that block. The closure 62 will be heavy enough to keep small fish from pushing it open but it will be light enough so fish in a desired size range can raise the lower end of that closure and pass inwardly under it. In the said one embodiment, the closure can be opened by catfish that are at least one pound in weight. In the event only very large fish were to be enticed, trapped and held, small weights or a light spring could be secured to the closure 62 to keep moderately-large fish from raising, and passing inwardly under, the lower edge of that closure.

The numeral 66 denotes an "exit only" closure for the outlet opening 37 in the rear 36 of the fish-trapping device 20. U-bolts 68 encircle one of the horizontal rods of that rear and one of the horizontal rods of that closure to permit ready rotation of that closure relative to that rear. The numeral 70 denotes an elongated rod which is longer than the width of outlet opening 37, and which is secured to the lower portion of closure 66. That rod is located externally of the rear 36, and it will keep the closure 66 from being rotated inwardly of outlet opening 37. However, that rod will not interfere with clockwise rotation of the closure 66 in FIG. 2 as a fish raises that closure and escapes from the fish-trapping device 20.

The numeral 72 denotes a "live net" which has the open end thereof releasably secured to the fish-trapping device 20 by cord-like extensions 76 which are readily secured to, and released from, the rear 36 of that fish-trapping device. The numeral 74 denotes an elongated float which performs the dual functions of holding a portion of the "live net" 72 close to the surface of the body of water and of causing that "live net" to spread over an appreciable horizontally-directed area so fish can freely enter, and swim around in, that "live net".

In using the enticing, trapping and holding system of FIGS. 1–3, a quantity of feed 55 will be placed in the feed pan 52, and a much larger quantity of feed will be placed in the hopper 45. Also, a small amount of feed will be placed on that portion of the bottom 22 which is intermediate the lower edge of closure 62 and the adjacent edge of that bottom. Thereafter, the fish-trapping device 20 will be placed in a body of water and held in a desired location by a tether or other suitable means. The "live net" 72 will not be secured to the fish-trapping device 20 at this time because fish tend to be wary of unfamiliar objects, and hence only limited numbers of fish could be expected to be trapped and held.

Fish will be enticed toward the fish-trapping device 20 by the feed which is resting on that portion of the bottom 22 which is adjacent the lower edge of the closure 62, and also will be enticed toward that device by the feed in the pan 52. The enticed fish will eat some or all of the feed which is on the bottom 22 adjacent the lower edge of the closure 62; and some of those fish will push the lower edge of that closure inwardly and pass under that lower edge to reach the feed in the pan 52. Small fish will be unable to raise the lower edge of closure 62, and hence will not be able to reach, and eat, the feed in pan 52.

As fish—which pushed the lower edge of the closure 62 far enough inwardly to enable them to pass under it—eat the feed in the pan 52, the ball-type valve in the conical end of hopper 45 will be raised upwardly by the spring within that hopper; and additional feed will fall downwardly through the opening 40 in block 38 and into the pan 52. As each fish satisfies its appetite, it will try to escape from the fish-trapping device 20. The closure 62 will bar the escape of such fish, the bottom 22 and sides 32 and 34 also will bar the escape of such fish, and the opening 40 will be small enough to enable the block 38 to bar the escape of such fish. Consequently, any fish which attempts to escape from the fish-trapping device 20 will have to swim out through the outlet opening 37. To allay the fears of the fish, the closure 66 could be held—by a bead chain, wire or other means—in full, or partially-open, position. Because the "live net" 72 is not connected to the rear 36 of that fish-trapping device, the fish will be able to swim away into other areas of the body of water.

Fish will be permitted to enter the fish-trapping device 20, satisfy their appetites, and then exit from that fish-trapping device until that fish-trapping device is no longer an unfamiliar sight to the fish. With many fish, it merely requires an initial filling, and one re-filling of hopper 45, to accustom the fish to the fish-trapping device 20. After the operator of the enticing, trapping and holding system decides that sufficiently-large numbers of fish have entered and escaped from that fish-trapping device, he will secure the open end of the "live net" to the rear 36 and will re-fill the hopper 45. That "live net" can, if desired, be secured to that fish-trapping device by a person wading in the water adjacent that fish-trapping device. Alternatively, that fish-trapping device can be removed from the body of water, have the "live net" secured to it, and then be returned to that body of water.

Fish will again be enticed by feed in the pan 52 and will again force the closure 62 far enough inwardly to enable them to pass under the lower edge of that closure and reach that feed. As each fish satisfies its appetite, it will again push the "exit only" closure 66 open and pass beneath its lower edge. However, instead of being free to swim to other places in the body of water, that fish will be securely confined within the "live net" 72. However, that "live net" will keep the fish in good condition until that "live net" is emptied by transferring the fish to containers for shipment. On at least one occasion, fish totalling more than six hundred pounds were enticed, trapped and held by the use of just twenty-five pounds of feed.

The periods of time during which the "live net" can keep fish in good condition will be a function of temperature and of the time of year. During cold spells, in the late fall, winter and early spring, fish can exist for more than a week without food. Consequently, during such spells, it is possible to refill the hopper 45 several times before the "live net" has to be emptied. In warmer weather, when fish cannot go as long without food, the "live net" will have to be emptied after fewer refillings of that hopper. After each filling of hopper 45, that hopper, the pan 52, the fish-trapping device 20, and the "live net" 72 will automatically entice, trap and hold fish.

One embodiment of the fish-trapping device 20 of FIGS. 1–3 is four feet long, four feet wide, and one and a half feet high. That fish-trapping device can, however, be larger or smaller as desired.

The fish-trapping device 20 is a very useful and effective fish-trapping device. Similarly, the hopper 45 is a very useful and effective source of feed for the pan 52 within that fish-trapping device. Also, the "live net" 72 is a very useful and effective means for holding fish that escape from the fish-trapping device. However, different forms of fish-trapping device, different forms of feed-holding devices, and different forms of devices to hold fish "live" could be used. The fish-trapping device 20 of FIGS. 1–3 is very desirable, because substantially every fish which enters that device will be forced to enter the "live net" or other means that is provided to hold the fish as they exit from that fish-trapping device.

Referring particularly to FIGS. 4–7, the numeral 98 generally denotes a second preferred embodiment of fish-trapping device which is part of an enticing, trapping and holding system for fish. That device has an open-type generally-rectangular lower frame 100 and a similar upper frame 102. Although those frames could be made in different ways and from different materials, they preferably are made from plastic or metal tubes or rods which are stiff, which can be bent to a given configuration, and which will thereafter retain that configuration. The numerals 104, 106, 108 and 112 denote, respectively, the bottom, sides and rear of the fish-trapping device 98. The front of that device normally is open. That bottom, those sides and that rear preferably are made from mesh, screen or screen-like sheets. Connectors 114 secure the upper edges of the sides 106 and 108 and of the rear 112 to the frame 102. Connectors 116 secure the bottoms of those sides and of that rear to the frame 100 and also to the edges of the bottom 104. Further connectors 116 connect the front edges of the sides 106 and 108 to vertically-disposed spacers 110; and still further connectors 116 connect the front edge of the bottom 104 to the front of frame 100. The connectors 114 and 116 can be short lengths of wire, cord or other securing material.

The rear 112 has an outlet opening 166 therein which preferably is the same as the outlet opening 37 in FIGS. 2 and 3. An "exit only" closure 168, which preferably is the same as the "exit only" closure 66 of FIGS. 2 and 3, is rotatably held adjacent the opening 166 by U-bolts 169. An elongated rod 171 adjacent the lower edge of closure 168, keeps that closure from being moved inwardly of the outlet opening 166.

The numeral 118 denotes a closure which is made from screen and which has a downwardly-directed peripheral flange 120 at the front and side edges thereof. That flange is deep enough and wide enough to effectively close the front of the device 98 whenever that closure is in the closed position indicated by the numeral 111 in FIG. 5. A reinforcing rod 122 extends diagonally between two of the corners of the closure 118, and a reinforcing rod 124 extends diagonally between the other two corners of that closure. Those reinforcing rods are secured to the upper surface of closure 118 by suitable connectors. The side edges of the front of the downwardly-directed peripheral flange 120 are connected to the front edges of the generally-triangular, downwardly-extending sides of that peripheral flange; and hence the closure 118 is a perforate, open-bottomed closure. That closure is dimensioned to fit closely within the space which is defined by the upper frame 102; and hence, whenever that closure is in the closed position indicated by the numeral 111 in FIG. 5, it will keep fish from rising upwardly over the tops of sides 106 and 108 and of rear 112 of the device 98, and it also will keep fish from escaping through the front of that device. A plate 161, with an opening in the rear thereof, is secured to the approximate midpoint of the front edge of the closure 118, as indicated particularly by FIG. 4. That plate will rest upon the upper surface of the upper frame 102 whenever that closure is in the closed position indicated by the numeral 111 in FIG. 5; and it will keep that closure from moving downwardly too far into the open top enclosure which is defined by the sides 106, 108 and the rear 112.

The numeral 130 denotes a stiff bar which is fixedly secured to the rear of frame 100 and to the rear of frame 102 by bolts 132. Where the sides 106 and 108 and the rear 112 are made of mesh, and where the fish-trapping device 98 is to be shipped in a collapsed state, the bar 130 will initially be separated from frame 100 or frame 102 and laid parallel to the rear edge of the other frame. That bar will subsequently be connected by the dealer or the fisherman to the frame from which it was initially separated.

The bolt 132, which is adjacent the bar 130, extends through that bar and through the frame 102 and is held by a nut. The upper end of that bar extends an appreciable distance above the frame 102 of the device 98.

The numeral 134 denotes a short board which overlies part of the bottom 104; and the numeral 136 denotes a further short board which underlies, and is in register with, the board 134. Bolts 138 and the nuts therefor fixedly secure those boards to that bottom. The numeral 140 denotes an elongated board which is rendered resistant to water-logging by paraffin or a suitable plastic impregnant. One end of that board is held immediately adjacent the midpoint of the board 134 by a hinge. A plate 142 of that hinge is secured to the boards 134 and 136 by bolts 144 and the nuts therefor. An elongated plate 146 of that hinge is secured to the left-hand end of the elongated board 140 by bolts 148; and the free end of that plate is bent to enable that plate to subtend an angle of about forty-five (45) degress. The tip of that free end is bent upwardly and forwardly about thirty (30) degrees. A hinge pin 150 holds the hinge plates 142 and 146 in assembled relation.

A feed pan 152, which can, and preferably will, be identical to the feed pan 52 of the fish-trapping device 20, is secured adjacent the free end of the elongated board 140 by bolts 154 and the nuts therefor. That feed pan is buoyant; and it will, whenever the fish-trapping device 98 is submerged in water, coact with the elongated board 140 to tend to cause that free end to rotate upwardly about the hinge pin 150. However, the buoyancy of that feed pan and of that elongated board can, as desired, be overcome by the placing of sufficient feed within that feed pan.

The numeral 156 denotes an elongated bolt which extends through an opening in the upwardly and forwardly-bent tip of the free end of the hinge plate 146; and a nut fixedly secures that bolt to that tip. After that bolt has been solidly secured to that tip, the threads on the underportion and sides of the exposed end of that bolt will be rendered smooth by filing or by filling them with a cement or other material. As a result, the lower portion and sides of the projecting end of the bolt 156 will be smooth.

One preferred embodiment of fish-trapping device 98 is four feet long, four feet wide, and one and one-half feet high. Such an embodiment has caught as much as one hundred (100) pounds of fish with one quantity of feed, and catches should average fifty (50) pounds or more.

Figure 6:
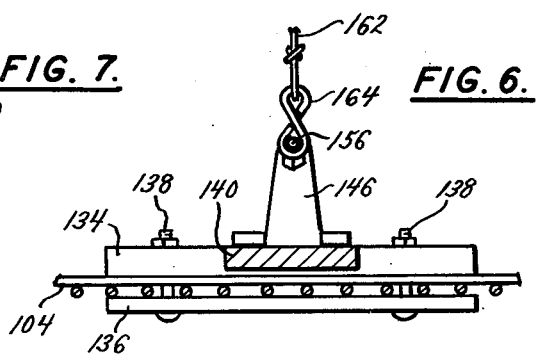
FIG. 6 is a sectional view, on a still larger scale, which is taken along the plane indicated by the line 6—6 in FIG. 5.

The numeral 158 denotes an eyebolt which is fixedly secured within an opening in the upper end of the bar 130 by a nut. A pulley 160 is secured to the eyebolt 158 so it cannot be accidentally separated from that eyebolt but can move relative to that eyebolt. A tether 162, which can be a rope, cord, chain or wire, has one end thereof fixed to the opening in the plate 161; and it passes through the pulley 160 and has an S-shaped hook 164 secured to the other end thereof. The portion of that tether, which is intermediate pulley 160 and S-shaped hook 164, is passed through one of the openings in the top of closure 118. That tether is made short enough so it will hold that closure open whenever that S-shaped hook is telescoped over the projecting end of the bolt 156, as shown in FIGS. 5 and 6. At such time, the rear portion of the periphery of the rotor of the pulley 160, the S-shaped hook 164 and the hinge pin 150 will define an essentially-straight line. This is desirable; because it makes certain that the force, which the weight of the closure 118 applies to the portion of the tether 162, intermediate hook 164 and pulley 160, does not develop a moment arm which could tend to raise or lower the free end of the elongated board 140.

The numerals 170 and 172 denote buoyant members which are secured to the sides 106 and 108 of the device 98 adjacent the upper edges of those sides. Those buoyant members will hold the upper frame 102 close to the surface of any body of water in which that device is placed; but they will not obstruct the open front of that device. All or essentially all of that open front will be located below the surface of that body of water to permit fish to freely enter the fish-trapping device 98.

To use the fish-trapping device 98, feed will be placed within the feed pan 152, and that pan will be permitted to move downwardly into engagement with, or immediately adjacent to, the bottom 104. Thereupon, the closure 118 will be moved to the approximate position shown by FIGS. 4 and 5, and the hook 164 will be telescoped over the projecting end of the bolt 156. Thereafter, the weight of that closure will be permitted to tension the tether 162; and the reaction force within that tether will hold that closure in the position of FIGS. 4 and 5. At such time, the fish-trapping device 98 can be pushed or pulled to a desired location in the body of water and held there by suitable tethers.

The closure 118 will remain "open", and will thereby permit fish to swim inwardly through the open front to the feed within the feed pan 152. After a substantial number of fish have entered that device and have eaten a sufficient amount of that feed, the buoyancy of the feed pan 152 and of the board 140 will cause that feed pan and the free end of that board to start moving upwardly. That movement will be completely noiseless, and it will be so slow and so gradual that it will not be perceived by the fish. As a result, the fish will continue to eat the feed. Before the feed pan 152 and the free end of the board 140 have moved upwardly forty-five degrees, the hook 164 will slip off the projecting end of the bolt 156, and will thereby permit the closure 118 to move to the closed position which is indicated by the numeral 111 in FIG. 5. At such time, that closure will entrap the fish within the device 98.

As soon as the fish realize that they are confined within the fish-trapping device 98, they will attempt to escape from that device. The bottom 104, the sides 106 and 108, and the closure 118 with its flange 120 will keep the fish from escaping through the bottom, sides, top or front of that device. However, the "exit only" closure 168 can be pushed open by the fish within the device 98 to permit those fish to move out of that device. As those fish move out from under the lower edge of the "exit only" closure 168, they will enter a "live net" 176 which has the open end thereof secured to the rear 112 of the device 98 by cord-like extensions 180. As a result, although the fish are permitted to escape from the fish-trapping device 98, they will be held by the "live net" 176. An elongated buoyant member 178 is secured to that "live net" to hold a portion of that "live net" near the surface and to cause that "live net" to define a fairly-large horizontal area.

To accustom fish to the fish-trapping device 98, that device can be positioned in a body of water with its closures 118 and 166 held open, with ample feed in the pan 152, and without the "live net" 176. After one or more refillings of that pan, the closure 166 can be permitted to assume the position of FIG. 5, the "live net" can be secured to the fish-trapping device 98, the pan 152 can be filled, and the tether 162 used to hold the closure 118 open. Thereafter all large fish, that are within that device when the S-hook 164 slips off of the elongated bolt, will be held by the "live net" as they raise and move beneath the closure 166. Those fish will continue to be held by that "live net" during subsequent refillings of pan 152 and re-settings of closure 118—until the operator decides to empty that "live net".

The bar 130 is shown at the rear of the fish-trapping device 98; and such an arrangement is desirable because it keeps that bar from overlying any part of the front of that device. However, as shown by my application for FISH-TRAPPING DEVICE which bears Ser. No. 373,081 filed 4/29/82 of Rogers, Eilers and Howell and which was filed concurrently with this application, the bar 130 can be secured to the fronts of the frames 100 and 102; and, in such event, the hinge pin 150, the hinge plate 146, the bolt 156, and the tether 162 would be located immediately adjacent the front of the frame 100. That arrangement is not as desirable as the arrangement in FIGS. 5 and 6—in the sense that the bar 130 spans the open front of the fish-trapping device 98; but that arrangement is more desirable than the arrangement in FIGS. 5 and 6—in the sense that tension in the tether 162 is much less. Consequently, when the front of a fish-trapping device is large enough so the spanning of that front by the bar 130 is not a serious deterrent to the entry of fish, it will be preferable to locate that bar, the hinge pin 150, the bolt 156 and the tether 162 adjacent the front of that fish-trapping device.

Figure 8:
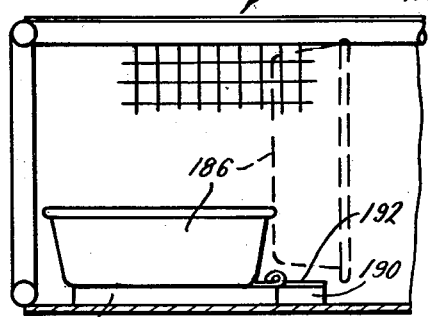
FIG. 8 is a sectional view of the entrance to a further fish-trapping device which can be used in an enticing, trapping and holding system for fish.

Referring particularly to FIG. 8, the numeral 184 generally denotes an enclosure which has an upper frame, a lower frame, a bottom, sides, a top and a rear that can be identical to the upper frame, lower frame, bottom, sides, top and rear of the enclosure of FIGS. 1–3. However, the enclosure 184 does not require a closure such as the closure 62 of FIGS. 1 and 3; because a feed pan 186 will serve as the closure for the enclosure 184. Specifically that feed pan is secured to an elongated board 188 which, in turn, is rotatably secured to the bottom of enclosure 184 by a board 190 and a hinge 192. That feed pan can move between the solid-line position and the dotted-line position shown by FIG. 8.

The feed pan 186 is buoyant; and it will tend to move to the dotted-line position whenever it is empty and the enclosure is submerged in water. However, that feed pan can be held in the solid-line position by feed therein. As long as the feed pan 186 is in the solid-line position of FIG. 8, it will permit fish to enter the enclosure 184. However, as the fish eat the feed, that feed pan will start moving upwardly toward the dotted-line position, thereby gradually urging the fish to move further into the enclosure 184, and finally blocking egress of the fish from that enclosure. When the fish realize that they cannot escape from the enclosure 184, because the feed pan 186 is blocking the normally-open entrance of that enclosure, those fish will pass through an "exit only" closure at the rear of that enclosure into a "live net".

Figure 9:
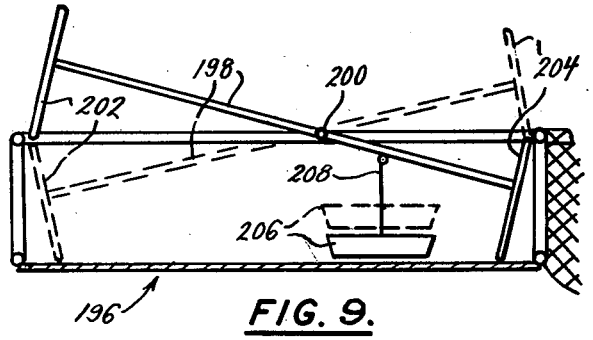
FIG. 9 is a sectional view, in kinematic form, of yet another fish-trapping device which can be used in an enticing, trapping and holding system for fish.

Referring particularly to FIG. 9, the numeral 196 generally denotes an enclosure which has an upper frame, a lower frame, a bottom, sides and a top that can be identical to the upper frame, lower frame, bottom, sides and top of the enclosure of FIGS. 1–3. However, instead of having a rear with an "exit only" closure, as does the enclosure of FIGS. 1–3, the enclosure 196 has a rotatable member 198 with a closure 204 which selectively blocks or opens the rear. That member rotates about a pivot 200; and it has a closure 202 which selectively blocks or opens the front. Narrow elongated slots, not shown, are provided in the top of the enclosure 196 to permit free rotation of the member 198 from the solid-line position to the dotted-line position in FIG. 9, and vice versa.

Whenever the member 198 is in the solid-line position, the closure 202 is out of register with the front of enclosure 196 to permit fish to enter that enclosure; but the closure 204 blocks the rear to keep fish, in a "live net" attached to that rear, from moving back into and through that enclosure. A feed pan 206 is suspended from the member 198 by a hanger 208. The member 198, the closures 202 and 204, the feed pan 206 and the hanger 208 are dimensioned so that member and those closures will be in the dotted-line position whenever that feed pan is empty. However, when feed is placed in feed pan 206, the weight of that feed plus the weight of that feed pan, of the rear portion of member 198, of hanger 208, and of closure 204 will hold that member in the solid-line position.

As the fish eat the feed within the feed pan, the member 198 and the closures 202 and 204 will move from the solid-line position to the dotted-line position. That movement will be noiseless, and it will not alarm the fish. However, when the fish have eaten their fill and determine that the originally-open front of enclosure 196 is blocked by the closure 202, those fish will move through the now-open rear of that enclosure into the "live net". Subsequently, the fisherman can raise the closure 202, insert further feed in the feed pan 206, and thereby again cause the member 198 and the closures 202 and 204 to be in the solid-line position. Thereafter, additional fish can enter the enclosure 196, be trapped, and then caused to move into the "live net".

Figure 7:
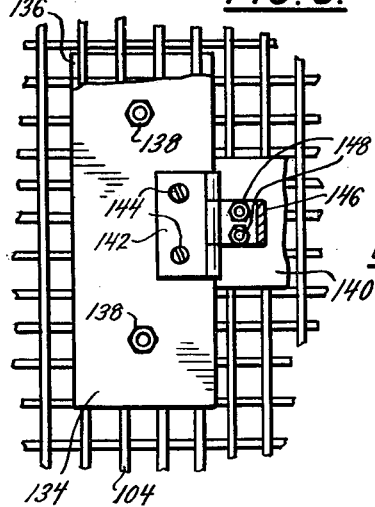
FIG. 7 is a sectional view, on the scale of FIG. 6, which is taken along the plane indicated by the line 7—7 in FIG. 5.

If desired, the feed pan 206 and the hanger 208 could be replaced by a hook at the lower end of a tether secured to the rear portion of member 198 and by a hinge plate and elongated bolt like the hinge plate 146 and elongated bolt 156 of FIGS. 5-7. One advantage, of using a hook and tether and the hinge plate and elongated bolt of FIGS. 5-7, is that movement of the member 198 and of the closures 202 and 204 from the solid-line position to the dotted-line position of FIG. 9 could be so rapid that fish, which were held in the "live net", would not be able to pass into and through the enclosure 196 while both closures 202 and 204 were in half-open positions.

The closure 62 of FIGS. 1 and 3, the closure 118 of FIGS. 4 and 5, the feed pan 186 of FIG. 8, and the closure 202 of FIG. 9 are not the only closures which could be used to close the front of a fish-trapping device to be used in an enticing, trapping and holding system for fish. Similarly, the closure 66 of FIGS. 2 and 3, the closure 168 of FIG. 5, and the closure 204 of FIG. 9 are not the only closures which could be used to close the rear of a fish-trapping device to be used in an enticing, trapping and holding system for fish. For example, the "one way" closures in FIGS. 15 and 16 of my U.S. Pat. No. 3,830,004 could be used as "exit only" closures or "entrance only" closures for a fish-trapping device to be used in an enticing, trapping and holding system for fish. Also, a number of generally-parallel, spaced-apart flexible strands of rubber or the like could be used as "exit only" closures or "entrance only" closures. Those flexible strands could have one or more transversely-directed wires immediately adjacent one face of each of those strands—those wires being located inwardly of those strands where the strands were to constitute an "exit only" closure, and those wires being located outwardly of those strands where those strands were to constitute an "entrance only" closure. Where those wires were located outwardly of those strands, fish could push those strands inwardly to enter an enclosure, but those fish could not push those strands outwardly to escape from that enclosure. However, where those wires were located inwardly of those strands, fish could push those strands outwardly to enter a "live net", but those fish could not push those strands inwardly to reenter the enclosure.

The closures for the enclosure of a fish-trapping device to be used in an enticing, trapping and holding system for fish can have many different forms. The important features of any closure that is to be used as an "entrance only" closure are that it permit ready entry of fish into an enclosure but that it discourage efforts of the fish to escape from that enclosure. The important features of any closure that is to be used as an "exit only" closure are that it permit ready entry of fish into a "live net" but that it discourage efforts of the fish to escape from that "live net".

The closure 62 is shown in fully-closed position in FIGS. 1 and 3, and the "exit only" closure 66 is shown in fully-closed position in FIGS. 2 and 3. Actually, however, those closures could be held partially open; as by providing abutments on the inner faces of the sides or on the bottom of the enclosure which would intercept the lower edge of closure 62 and hold it a predetermined distance above the bottom of the floor 22, and by providing abutments on closure 66 or on the rear 36 which would intercept the lower edge of that closure and hold it a predetermined distance rearwardly of that rear. Where large fish are to be trapped by an enclosure, the spacing of the bottom of the closure 62 a short distance above the floor 22 would not permit any of those fish to escape, but such spacing would reduce the total amount of movement which fish would have to impart to that enclosure to pass beneath it. Similarly, where the initial spacing between the bottom of the "exit only" closure 66 of FIGS. 2 and 3 was smaller than the size of the fish to be held within the "live net", that spacing would not permit any fish to pass from that "live net" back into the enclosure, but such spacing would reduce the total amount of movement which fish would have to impart to that enclosure.

The spacing of the bottoms of the "exit only" and "entrance only" closures from adjacent portions of an enclosure also would be useful where that enclosure was used to trap fish and minnows which were so small that they did not have sufficient strength to move the closures. In such event, the closures would always leave predetermined small spaces for small fish and minnows to enter the enclosure and then pass from that enclosure into a "live net". Although it would be possible for the small fish and minnows to pass back through those small spaces into and out of the enclosure, small fish and minnows exhibit a reluctance to pass through narrow spaces which are defined, at least in part, by an exposed edge of a surface. This is particularly true where that exposed edge is inclined toward the small fish and minnows as they approach that space. If desired, small floats or buoyant members could be secured to the "entrance only" and "exit only" closures, where those closures were to be moved by small fish or minnows. Those floats or buoyant members should make it possible to open those closures with only very small forces, but those floats or buoyant members should permit those closures to close in response to gravity.

The bottoms of the enclosures preferably will be solid or will have interstices that are so small that any feed which is pushed out of the feed pans will be held by those bottoms. That feed will be available to attract fish into the enclosures; and, where that feed comes to rest immediately adjacent the fronts of those enclosures, it will be easily sensed by fish which have not yet entered those enclosures.

The floats or buoyant members, which hold the "live nets" close to the surfaces of the bodies of water, are desirable; because the water adjacent the surfaces of bodies of water usually has higher percentages of oxygen than the water adjacent the bottoms of those bodies of water. The use of the enticing, trapping and holding system for fish which is provided by the present invention obviates the need of seining bodies of water. In actuality, it is easier and less costly to catch and hold fish with that enticing, trapping and holding system for fish than it is to seine for those fish; and, in addition, the use of that enticing, trapping and holding system for fish obviates the unpleasant taste in the meat of fish which eat residue stirred up during the seining of a body of water.

The enticing, trapping and holding system for fish of the present invention has been used to catch cat fish. However, that system could be adapted to catch other fish, turtles, shrimp, lobsters and other aquatic creatures.

Where desired, the fish-trapping devices of the present invention can easily be used as fish feeding devices. All that need be done is hold the "entrance only" closures continuously open; and the closure 62 could be held continuously open by a bead chain or other tether which extended from the lower edge of that closure up through the opening 40 and was secured to one of the legs 53. The closure 118 could be held continuously open by a rod which was tied to the sides of the upper frame 102 and which underlaid the side flanges of that closure. The feed pan 186 could be tied down in its solid-line position; and the member 198 could be tied down in its solid-line position. Whenever it became desirable to have those fish-trapping devices trap fish, the "entrance only" closures could be released to perform their intended functions.

The enticing, trapping and holding systems provided by the present invention can be used in a pond, lake, stream, river or any other body of water, because they do not have to have portions thereof extend from bank to bank or shore to shore. Also, whenever those systems are used in a pond, lake, stream, river or any other body of water, they can entice fish from all areas of that pond, lake, stream, river or any other body of water—and hence are not limited to the trapping of up-stream fish. As a result, the enticing, trapping and holding systems provided by the present invention are very versatile and useful.

Whereas the drawing and accompanying description have shown and described two preferred embodiments of the present invention, it should be apparent to those skilled in the art that various changes may be made in the form of the invention without affecting the scope thereof.

What I claim is:

1. A system for enticing, trapping and holding fish which comprises space-defining means to define a space into which fish can be enticed, said space-defining means having an inlet through which fish can enter said space, escape-preventing means disposable in a predetermined position to permit fish to enter said space via said inlet and disposable in a further predetermined position to prevent the escape of fish of a given size from said space via said inlet, feed-holding means which can hold a replenishable feed in said space and thereby entice fish into said space, said escape-preventing means automatically moving from said predetermined position to said further predetermined position to prevent the escape of fish from said space via said inlet whenever fish have eaten said replenishable feed held by said feed-holding means, said space-defining means having an exit from said space, a "live net" in communication with said exit from said space to receive fish that leave said space via said exit and to thereafter hold said fish, and a readily-movable "exit only" closure for said exit which normally occupies a blocking position adjacent said exit wherein it blocks said exit, said readily-movable "exit only" closure being movable away from said blocking position by fish of said given size attempting to escape from said space-defining means and thereby permitting said fish to pass through said exit from said space into said "live net", said "exit only" closure thereafter automatically returning to said blocking position to keep fish, which are of said given size and which have passed through said exit and which are within said "live net", from passing back through said exit into said space, whereby said escape-preventing means and said readily-movable "exit only" closure coact with said space-defining means to promote irreversible, progressive movement of fish into and through said space into said "live net", and whereby said readily-movable "exit only" closure coacts with said "live net" to permit replenished amounts of feed to entice successive groups of fish into said space-defining means so said space-defining means can trap said successive groups of fish and said "live net" can thereafter hold said successive groups of fish.

2. A system as claimed in claim 1 wherein buoyancy-providing means associated with said space-defining means hold said space-defining means adjacent the level of a body of water, wherein further buoyancy-providing means hold said part of said "live net" adjacent said level of said body of water, and wherein said further buoyancy-providing means is movable relative to the first said buoyancy-providing means to permit portions of said "live net" to move relative to said space-defining means.

3. A system for enticing, trapping and holding fish which comprises space-defining means to define a space into which fish can be enticed, said space-defining means having an inlet through which fish can enter said space, escape-preventing means disposable in a predetermined position to permit fish to enter said space via said inlet and disposable in a further predetermined position to prevent the escape of fish of a given size from said space via said inlet, feed-holding means which can hold a replenishable feed in said space and thereby entice fish into said space, said escape-preventing means automatically moving from said predetermined position to said further predetermined position to prevent the escape of fish from said space via said inlet whenever fish have eaten said replenishable feed held by said feed-holding means, said space-defining means having an exit from said space, a "live net" in communication with said exit from said space to receive fish that leave said space via said exit and to thereafter hold said fish, a readily-movable "exit only" closure for said exit which normally occupies a blocking position adjacent said exit wherein it blocks said exit, said readily-movable "exit only" closure being movable away from said blocking position by fish of said given size attempting to escape from said space-defining means and thereby permitting said fish to pass through said exit from said space into said "live net", said "exit only" closure thereafter automatically returning to said blocking position to keep fish, which are of said given size and which have passed through said exit and which are within said "live net", from passing back through said exit into said space, whereby said escape-preventing means and said readily-movable "exit only" closure coact with said space-defining means to promote irreversible, progressive movement of fish into and through said space into said "live net", and whereby said readily-movable "exit only" closure coacts with said "live net" to permit replenished amounts of feed to entice successive groups of fish into said space-defining means so said space-defining means can trap said successive groups of fish and said "live net" can thereafter hold said successive groups of fish, a reservoir for feed disposed above said space-defining means, said reservoir automatically responding to the consumption of feed in said feed-holding means to release further feed for free-fall into said feed-holding means to automatically replenish the supply of feed within said space and thereby keep said escape-preventing means from moving from said predetermined position to said further predetermined position until said reservoir is substantially empty.

4. A system for enticing, trapping and holding fish which comprises space-defining means to define a space into which fish can be enticed, said space-defining means having an inlet through which fish can enter said space, escape-preventing means disposable in a predetermined position to permit fish to enter said space via said inlet and disposable in a further predetermined position to prevent the escape of fish of a given size from said space via said inlet, feed-holding means which can hold a replenishable feed in said space and thereby entice fish into said space, said escape-preventing means automatically moving from said predetermined position to said further predetermined position to prevent the escape of fish from said space via said inlet whenever fish have eaten said replenishable feed held by said feed-holding means, said space-defining means having an exit from said space, a "live net" in communication with said exit from said space to receive fish that leave said space via said exit and to thereafter hold said fish, a readily-movable "exit only" closure for said exit which normally occupies a blocking position adjacent said exit wherein it blocks said exit, said readily-movable "exit only" closure being movable away from said blocking position by fish of said given size attempting to escape from said space-defining means and thereby permitting said fish to pass through said exit from said space into said "live net", said "exit only" closure thereafter automatically returning to said blocking position to keep fish, which are of said given size and which have passed through said exit and which are within said "live net", from passing back through said exit into said space, whereby said escape-preventing means and said readily-movable "exit only" closure coact with said space-defining means to promote irreversible, progressive movement of fish into and through said space into said "live net", and whereby said readily-movable "exit only" closure coacts with said "live net" to permit replenished amounts of feed to entice successive groups of fish into said space-defining means so said space-defining means can trap said successive groups of fish and said "live net" can thereafter hold said successive groups of fish, said escape-preventing means being a closure that normally closes said inlet opening but being openable by fish seeking to enter said space to eat the feed held by said feed-holding means, and said inlet opening and said exit being oppositely disposed of said feed-holding means.

5. A system as claimed in claim 1 wherein said escape-preventing means is a closure that normally closes said inlet opening but is openable by fish seeking to enter said space to eat the feed held by said feed-holding means, wherein said escape-preventing closure is pivoted, wherein said escape-preventing closure inclines downwardly and inwardly relative to said space so fish can readily raise the bottom of said escape-preventing closure upwardly to pass underneath it and so gravity will automatically return said escape-preventing closure to its normal closed position, and wherein said inlet opening and said exit are oppositely disposed of said feed-holding means.

6. A system as claimed in claim 1 wherein said escape-preventing means is a closure that normally closes said inlet opening but is openable by fish seeking to enter said space to eat the feed held by said feed-holding means, wherein said closure is pivoted, wherein said closure inclines downwardly and inwardly relative to said space so fish can readily raise the bottom of said closure upwardly to pass underneath it and so gravity will automatically return said closure to its normal closed position, wherein said space-defining means has a surface adjacent the bottom of said closure for said inlet opening on which feed can be placed to entice fish to the immediate proximity of said inlet opening, and wherein said surface has a portion thereof disposed inwardly of at least one boundary of said space.

7. A system as claimed in claim 1 wherein said escape-preventing means is a closure, wherein said predetermined position is an open position of said escape-preventing closure and wherein said further predetermined position is a closed position of said escape-preventing closure, wherein said escape-preventing closure permits fish to enter and leave said space as long as said escape-preventing closure is in its open position, wherein said escape-preventing closure will keep fish from leaving said space whenever said escape-preventing closure is in its closed position, wherein said escape-preventing closure remains in its open position as long as a predetermined amount of feed is held by said feed-holding means, wherein said escape-preventing closure automatically moves to its closed position whenever less than said predetermined amount of feed is in said feed-holding means, and wherein said escape-preventing closure is substantially as wide as said space.

8. A system as claimed in claim 1 wherein said escape-preventing means is a closure, wherein said predetermined position is an open position of said escape-preventing closure and wherein said further predetermined position is a closed position of said escape-preventing closure, wherein said escape-preventing closure permits fish to enter and leave said space as long as said escape-preventing closure is in its open position, wherein said escape-preventing closure will keep fish from leaving said space whenever said escape-preventing closure is in its closed position, wherein said escape-preventing closure remains in its open position as long as a predetermined amount of feed is held by said feed-holding means, wherein said escape-preventing closure automatically moves to its closed position whenever less than said predetermined amount of feed is in said feed-holding means, wherein said escape-preventing closure is subsequently openable to replenish the supply of feed in said feed-holding means while fish are held in said "live net", wherein said escape-preventing closure will remain open until said repleniahed supply of feed is less than said predetermined amount of feed and will then automatically move again to its closed position, wherein said "exit only" closure will hold fish within said "live net" while said escape-preventing closure is opened during the replenishing of the feed in said feed-holding means, and wherein said "exit only" closure will continue to hold fish in said "live net" while said escape-preventing closure remains in its open position.

9. A system as claimed in claim 1 wherein said escape-preventing means is a closure, wherein said predetermined position is an open position of said escape-preventing closure and wherein said further predetermined position is a closed position of said escape-preventing closure, wherein said escape-preventing closure permits fish to enter and leave said space as long as said escape-preventing closure is in its open position, wherein said escape-preventing closure will keep fish from leaving said space whenever said escape-preventing closure is in its closed position, wherein said escape-preventing closure remains in its open position as long as a predetermined amount of feed is held by said feed-holding means, wherein said escape-preventing closure automatically moves to its closed position whenever less than said predetermined amount of feed is in said feed-holding means, wherein said feed-holding means tends to rise toward the surface of any body of water in which said fish-trapping device is disposed, wherein the weight of said predetermined amount of feed is able to keep said feed-holding means from rising toward said surface of said body of water, wherein a holding means mechanically holds said escape-preventing closure in its open position as long as the weight of said feed keeps said feed-holding means from rising toward said surface of said body of water, and wherein said holding means releases said escape-preventing closure from movement to its closed position when said feed-holding means moves toward said surface of said body of water.

10. A system as claimed in claim 1 wherein buoyancy-providing means associated with said space-defining means hold said space-defining means adjacent the level of a body of water, wherein said buoyancy-providing means hold a reservoir for feed above said level of said body of water, wherein said reservoir automatically responds to the consumption of feed in said feed-holding means to release further feed for free-fall into said feed-holding means to automatically replenish the supply of feed within said space and thereby keep said escape-preventing means from moving from said predetermined position to said further predetermined position until said reservoir is substantially empty, and wherein the upper portion of said space-defining means will permit the released feed to pass through it for free-fall into said feed-holding means to automatically replenish the supply of feed within said space.

11. A system as claimed in claim 1 wherein buoyancy-providing means associated with said space-defining means holds said space-defining means adjacent the level of a body of water, wherein said buoyancy-providing means disposes substantially all of said inlet below said level of said body of water, wherein said buoyancy-providing means disposes said exit below said level of said body of water, wherein further buoyancy-providing means holds part of said "live net" adjacent said level of said body of water, wherein said further buoyancy-providing means permits the portion of said "live net", which is in communication with said exit from said space, below said level of said body of water, and wherein said further buoyancy-providing means is movable relative to the first said buoyancy-providing means to permit portions of said "live net" to move relative to said space-defining means.

12. A system as claimed in claim 1 wherein said inlet is in one wall of said space-defining means, wherein said exit is in an opposite wall of said space-defining means, and wherein said feed-holding means is intermediate and spaced from said inlet and said exit.

13. A system as claimed in claim 1 wherein said space-defining means is disposable within a body of water at a point which is displaced from the shore of said body of water so a fish can move from any other point in said body of water to reach and pass inwardly through said inlet.

14. A system for enticing, trapping and holding fish which comprises space-defining means to define a space into which fish can be enticed, said space-defining means having an inlet through which fish can enter said space, feed-holding means which can hold a replenishable feed in said space and thereby entice fish into said space, said feed-holding means tending to rise toward the surface of a body of water in which said space-defining means is disposed but being adapted to be held against rising toward said surface of said body of water by the weight of said feed, said feed-holding means responding to the eating of substantial amounts of the feed therein to start rising toward said surface of said body of water, said feed-holding means permitting fish to enter said space within said space-defining means through said inlet whenever said feed-holding means is held against rising toward said surface of said body of water, said feed-holding means keeping fish from escaping from said space in said space-defining means via said inlet whenever said feed-holding means rises toward said surface of said body of water, said space-defining means having an exit from said space, a "live net" in communication with said exit from said space to receive fish that leave said space via said exit and to thereafter hold said fish, and an "exit only" closure for said exit which permits fish to pass through said exit from said space into said "live net", said "exit only" closure thereafter keeping fish within said "live net" from passing back through said exit into said space, whereby replenished amounts of feed within said feed-holding means can hold said feed-holding means against rising toward said surface of said body of water and also can entice successive groups of fish so said space-defining means can trap said successive groups of fish and said "live net" can thereafter hold said successive groups of fish.

15. A system as claimed in claim 14 wherein said feed-holding means is adjacent said inlet, and wherein said feed-holding means rotates upwardly and inwardly relative to said space within said space-defining means as it rises toward said surface of said body of water.

16. A system for enticing, trapping and holding fish which comprises space-defining means to define a space into which fish can be enticed, said space-defining means having an inlet through which fish can enter said space, said space-defining means having an exit from said space, a "live net" in communication with said exit from said space to receive fish that leave said space via said exit and to thereafter hold said fish, a closure for said inlet which normally is in an "open" position, a second closure for said exit which normally is in a "closed" position, feed-holding means which can hold feed in said space and thereby entice fish into said space, and further means which responds to the holding of feed by said feed-holding means to normally hold the first said closure in said "open" position while holding said second closure in said "closed" position, said further means responding to the eating of substantial portions of said feed by fish to cause the first said closure to move to a "closed" position while said second closure moves to an "open" position.

* * * * *